United States Patent [19]

Fischer

[11] Patent Number: 4,609,129
[45] Date of Patent: Sep. 2, 1986

[54] DEVICE FOR INJECTING A FIXING AGENT INTO A DRILLED HOLE FOR ANCHORING A FASTENING ELEMENT INSERTED IN THE DRILLED HOLE

[76] Inventor: Artur Fischer, Weinhalde 34, 7244 Waldachtal 3/Tumlingen, Fed. Rep. of Germany

[21] Appl. No.: 668,077

[22] Filed: Nov. 5, 1984

[30] Foreign Application Priority Data

Nov. 15, 1983 [DE] Fed. Rep. of Germany ....... 3341283

[51] Int. Cl.⁴ .......................... B65D 25/40; B67C 3/02
[52] U.S. Cl. ................................... 222/145; 222/319; 222/386; 222/573; 52/173 R; 52/704; 141/98; 206/219; 604/231
[58] Field of Search ............... 222/320, 386, 573, 574, 222/522, 525, 325, 326, 145, 192, 541, 319; 141/98, 311 R, 357, 374, 392; 52/173 R, 309.2, 309.5, 704, 744; 425/11–13, DIG. 27; 206/219, 222; 366/130; 604/203, 231, 56, 92, 82, 89, 246

[56] References Cited

U.S. PATENT DOCUMENTS

| 714,212 | 11/1902 | Marks | 222/386 X |
|---|---|---|---|
| 1,238,403 | 8/1917 | Hellein | 222/386 X |
| 2,252,115 | 8/1941 | Brue | 222/386 X |
| 2,614,660 | 10/1952 | House | 222/573 X |
| 2,763,405 | 9/1956 | Shvetz | 222/386 X |
| 3,472,433 | 10/1969 | Thomas | 222/541 |
| 3,684,136 | 8/1972 | Baumann | 206/219 X |
| 3,829,926 | 8/1974 | Salladay | 222/572 X |
| 4,014,463 | 3/1977 | Hermann | 222/145 |
| 4,120,128 | 10/1978 | Pauls | 52/704 X |
| 4,308,977 | 1/1982 | Sigmund et al. | 222/386 X |

FOREIGN PATENT DOCUMENTS

| 1683/26 | of 1926 | Australia | 222/386 |
|---|---|---|---|
| 2730110 | 1/1979 | Fed. Rep. of Germany . | |
| 29051 | 9/1957 | Finland | 52/744 |
| 632896 | 1/1928 | France | 222/320 |
| 844179 | 7/1939 | France | 604/231 |

Primary Examiner—Joseph J. Rolla
Assistant Examiner—Kevin P. Shaver
Attorney, Agent, or Firm—Michael J. Striker

[57] ABSTRACT

A device for injecting a fixing agent for anchoring a fastening element in a drilled hole comprises a vessel which includes a housing, which contains one component of the fixing agent and can be sealed, an injection nozzle and a plunger. The plunger is movable into the vessel housing. An injection nozzle is arranged on the plunger. The overall length of the plunger and the injection nozzle matches the height of the interior of the vessel housing. Thus, all of the fixing agent can be injected as a result of pressure applied to the base of the vessel housing.

8 Claims, 2 Drawing Figures

DEVICE FOR INJECTING A FIXING AGENT INTO A DRILLED HOLE FOR ANCHORING A FASTENING ELEMENT INSERTED IN THE DRILLED HOLE

BACKGROUND OF THE INVENTION

The invention relates to a vessel for injecting a fixing agent for anchoring a fastening element in a drilled hole. Vessels of the foregoing type comprise a housing which contains one component of the fixing agent and can be sealed, an injection nozzle and a plunger which can be moved in the vessel housing.

The retaining force of conventional fastening elements is based on wedging an expandable part of the fastening element in the drilled hole, for example by screwing in a fastening screw. The expansion produces stresses, which however permit only small retaining forces, especially in porous and soft masonry materials. Fastening elements which can be anchored without stress by injecting a fixing agent around them have proved to be especially suitable for such materials. In a known anchoring method of this type the fixing agent, for example a cement mixture, is drawn up into an injection device after being mixed and is then injected into the drilled hole by means of the device. For individual mountings, however, it is not generally worth purchasing such an injection device. Furthermore, an additional vessel is necessary for mixing the fixing agent. Both the injection device and the additional vessel have to be cleaned immediately after use, or, in the case of a series of mountings, at short, regular intervals, in order to avoid hardening and prevent the implements from becoming unusable.

A disposable vessel is known, for example, from DE-OS No. 27 30 110. This vessel is, however, still very expensive to manufacture. Its handling also presents difficulties, as a rod-like device is required for pushing-in the plunger.

SUMMARY OF THE INVENTION

It is an object of the present invention to provide a disposable vessel which is economical in manufacture and which makes it possible to inject the fixing agent, which has been stirred in the vessel, without the use of additional devices.

This and other objects are attained according to the invention by the fact that the injection nozzle is arranged on the plunger and the overall length of the plunger and the injection nozzle corresponds to the height of the interior of the vessel housing.

The cylindrical vessel housing, comprised, for example of impregnated cardboard or sheet metal, is filled with such an amount of one component of the fixing agent, which is required for one mounting. The base of the vessel housing is rigidly connected to the housing, while the filling opening may be sealed by a lid which closes the opening in such a manner that it is air-tight and/or by a tear-off film after that one component has been introduced. In order to mix the fixing agent, generally a cement mixture, the lid and/or the tear-off film is removed and the second component—water in the case of a cement mixture—is introduced into the vessel. After the mixture has been stirred, the plunger, provided with the injection nozzle, is placed on the opening and the nozzle is attached to the injection orifice of the fastening element. As a result of pressure applied to the base of the vessel housing, the plunger enters the vessel and in the process pushes the mixture through the injection nozzle into the drilled hole. Since the overall length of the plunger, together with the injection nozzle, corresponds to the height of the interior of the vessel housing, all of the mixture can be injected.

In a further development of the invention, the plunger may have a cup-shaped cavity which opens in the direction of the injection nozzle. The capacity of the cavity for the other component may be in a predetermined ratio to the amount of the component of the fixing agent contained in the vessel housing; said ratio corresponds to a mixing ratio or to a submultiple of the mixing ratio. As a result of this construction, the plunger can be used as a means for introducing the other component. Since one or more complete charges are in the amounts to ensure the correct mixing ratio, it is ensured that the mixed fixing agent always has the best possible properties. This makes the anchoring process easier to carry out, even for someone who is unpracticed.

DETAILED DESCRIPTION OF THE PREFERRED EMBODIMENT

Figure 1:
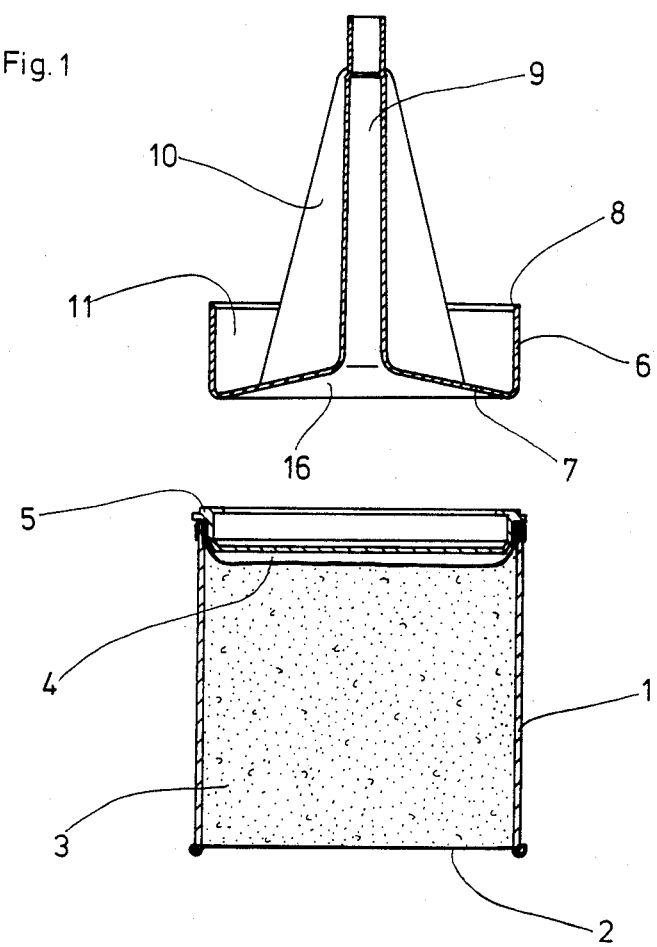
FIG. 1 is an exploded sectional view of the vessel housing, which has been filled with one component and sealed, and the plunger having an injection nozzle.
Figure 2:
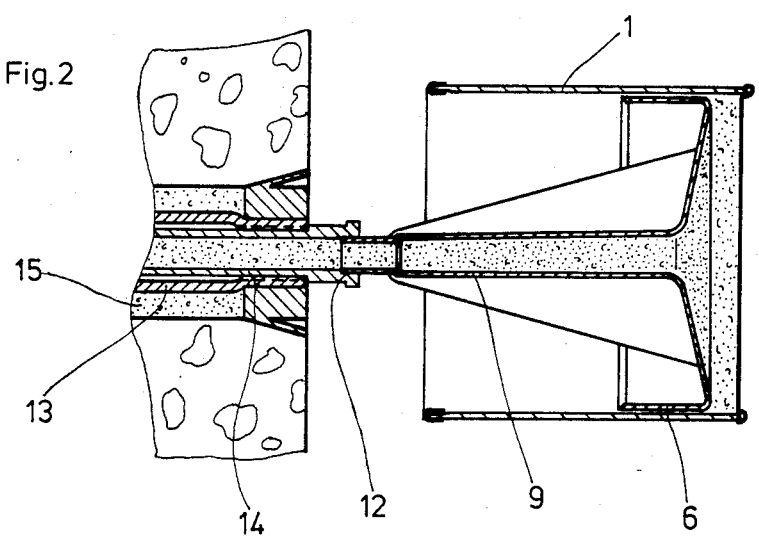
FIG. 2 is a sectional view of the fastening element, which has been inserted into a drilled hole in the masonry, after the injection operation by the injection vessel of the invention.

Referring now to the drawings in detail and first to FIG. 1 thereof, it will be seen that the vessel includes a housing 1, comprised of impregnated cardboard or sheet metal, and designed as a cup-shaped hollow cylinder having a base 2. After one component 3 of the fixing or binding agent has been introduced into the vessel housing 1, the housing is sealed by means of a tear-off film 4 and/or optionally by means of a plastic lid 5. The vessel for injecting the binding agent also comprises a plunger 6, having the shape of a cup with a base 7. Plunger 6 has an injection nozzle 9 which projects over the edge 8 of the plunger 6. Base 7 merges into the elongated injection nozzle 9. In order to stabilize the injection nozzle 9, which is manufactured in one piece with the plunger 6 by means of injection moulding, fins or ribs 10, connected to the base 7 of the plunger 6, are provided. The capacity of a cup-shaped cavity 11 formed in the plunger 6 is selected so as to ensure that one or more complete charges of the other component of the binding agent provide for the best possible mixing ratio.

In the case of using a cement mixture water, which is to be filled into cavity 11, is the other component of the binding agent.

After the housing 1 of the injection vessel has been opened by lifting off the lid 5 or by tearing off the film 4 an appropriate amount of water is introduced into housing 1 filled with component 3 by means of the plunger 6 and is mixed with the component 3 by stirring, shaking or the like. After the plunger 6 has been placed into the opening of the vessel housing 1 the injection nozzle 9 is attached to a filling orifice 12 provided in a fastening element 13, and as a result of pressure applied to the base 2 of the vessel housing 1, the cement mixture is injected into a drilled hole 15 through the injection nozzle 9 and a sleeve 14 inserted into the fastening element 13. During the injection operation the housing 1 of the injection vessel is moved in the direction of the surface of the masonry, while the plunger 6 together with the injection nozzle 9 is supported on the fastening element 13. As the overall height of the plunger and the injection nozzle corresponds to the height of the interior of the vessel housing, the whole amount of the cement mixture can be injected. In order to obtain an advantageous flow of fixing agent during the injection operation, the base 7 of the plunger 6 may have an inflow funnel 16.

It will be understood that each of the elements described above, or two or more together, may also find a useful application in other types of devices for injecting fixing agents into drilled holes differing from the types described above.

While the invention has been illustrated and described as embodied in a device for injecting a fixing agent into a drilled hole for anchoring in that hole a fastening element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for injecting a fixing agent into a drilled hole for anchoring a fastening element inserted in said hole, comprising a vessel filled with one component of the fixing agent and sealingly closable with sealing means; a plunger including a measuring cavity for measuring a predetermined quantity of another component of said fixing agent, said measuring cavity to be filled with said another component of said fixing agent; and an injection nozzle mounted on said plunger, said plunger being movable into said vessel after said sealing means have been removed from said vessel whereby said another component is poured from said measuring cavity into said vessel filled with said one component and mixed to form in said vessel a mixture of said one and another component prior to mounting said plunger nozzle combination on said vessel so that the mixture is discharged from said vessel through said nozzle as pressure is applied to said vessel against said plunger and injection nozzle, said plunger and said injection nozzle having an overall length which matches a height of an interior of said vessel.

2. The device as defined in claim 1, wherein said measuring cavity is cup-shaped and opens in the direction of said injection nozzle.

3. The device as defined in claim 2, wherein said measuring cavity has a capacity which is in a predetermined ratio to the amount of said one component contained in said vessel.

4. The device as defined in claim 3, wherein the capacity of said measuring cavity is selected in accordance with a mixing ratio or a submultiple of the mixing ratio between said one component and said another component of the fixing agent.

5. The device as defined in claim 3, wherein said injection nozzle is formed in one piece with said plunger.

6. The device as defined in claim 5, wherein said injection nozzle is positioned centrally of said measuring cavity and outwardly projects from said cavity.

7. The device as defined in claim 6, further including ribs formed on said injection nozzle.

8. The device as defined in claim 7, wherein said plunger has a base formed with a funnel on an outer surface thereof.

* * * * *